May 24, 1927.
A. P. EKVALL
1,630,235
LABELING MACHINE
Filed April 29, 1926    8 Sheets-Sheet 1
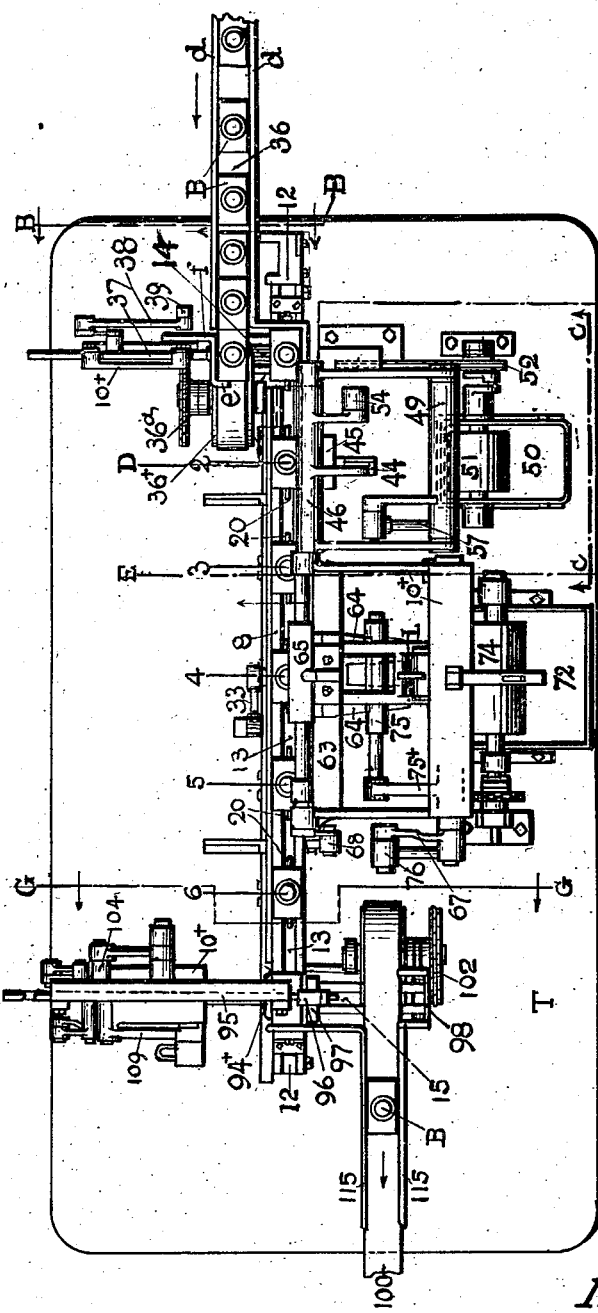
Inventor.
Arvid P. Ekvall
By Chas H Burleigh.
Attorney.

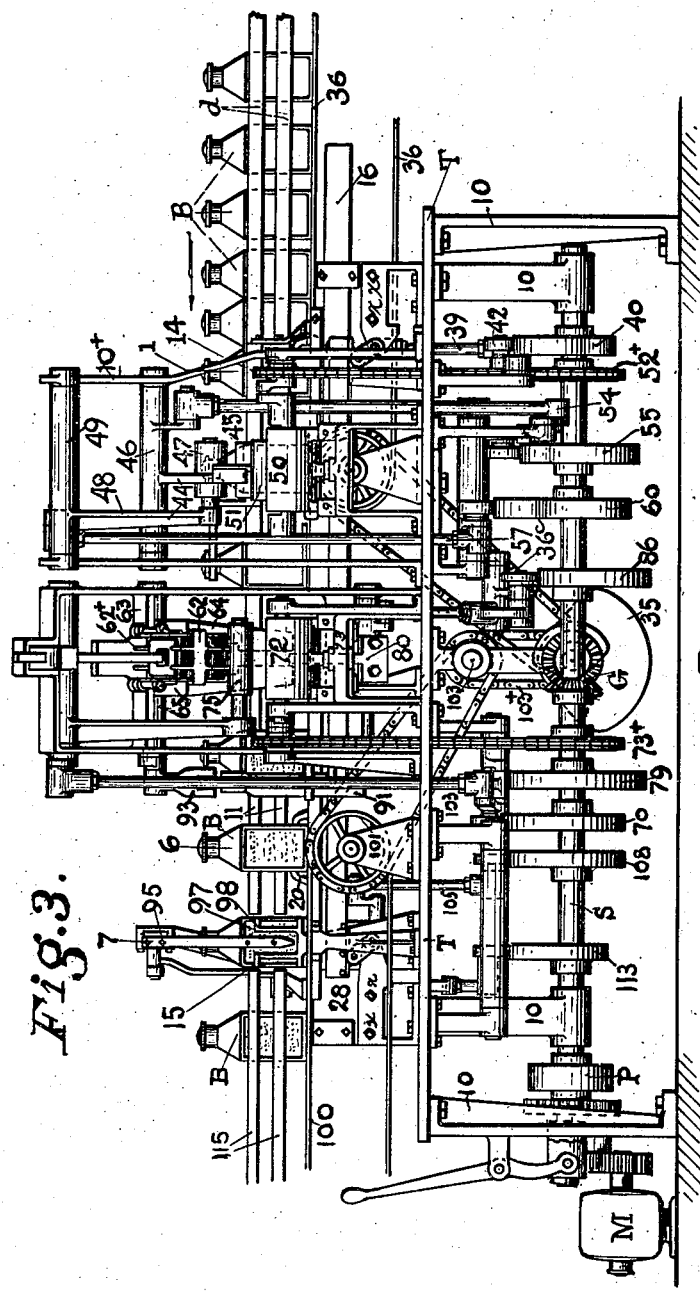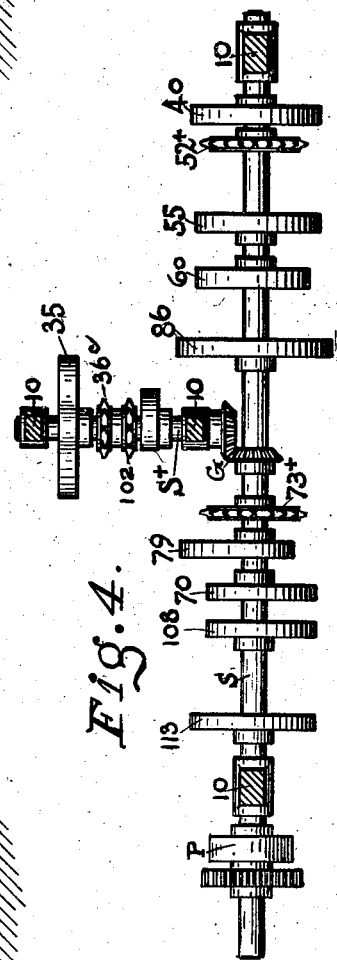

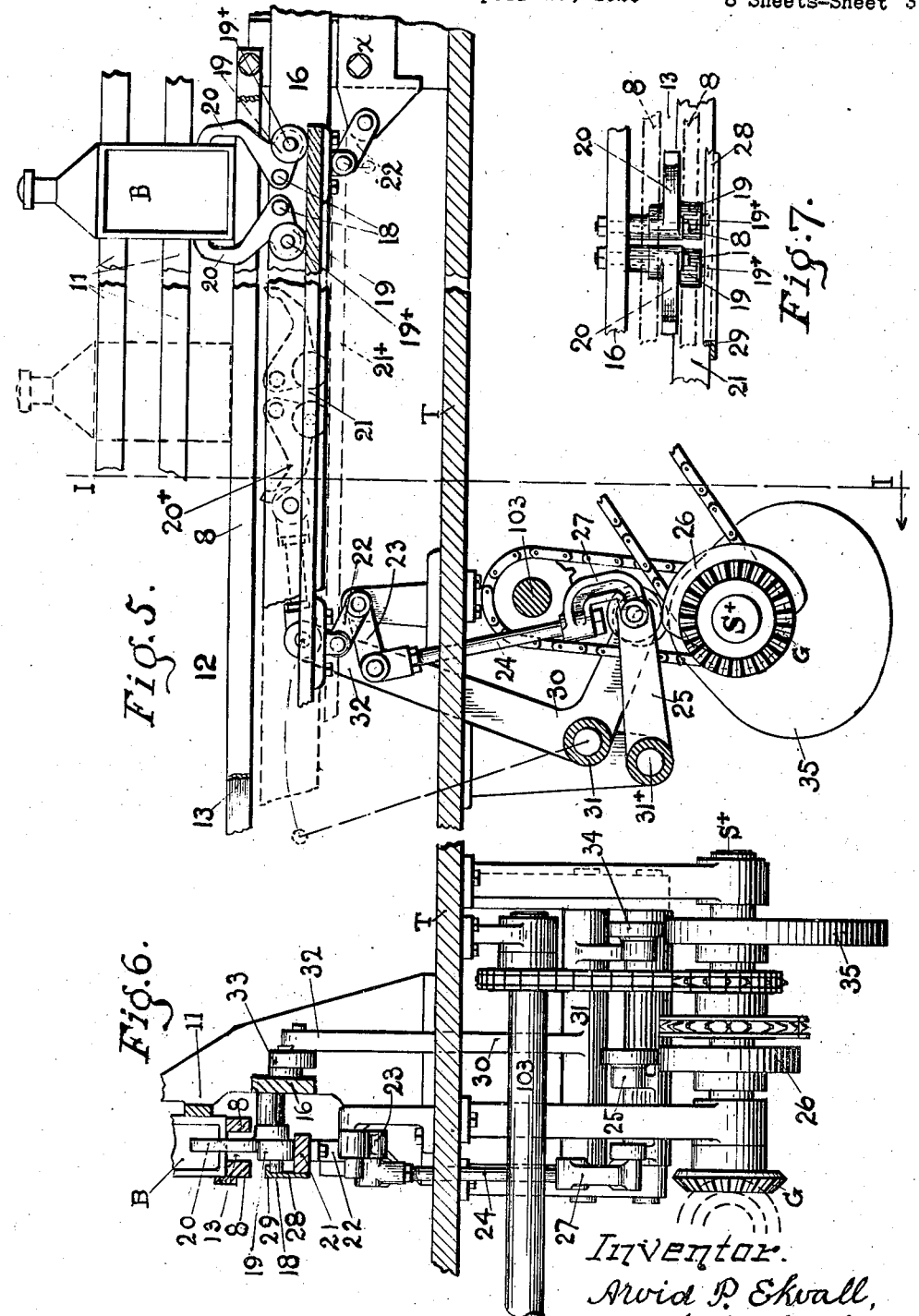

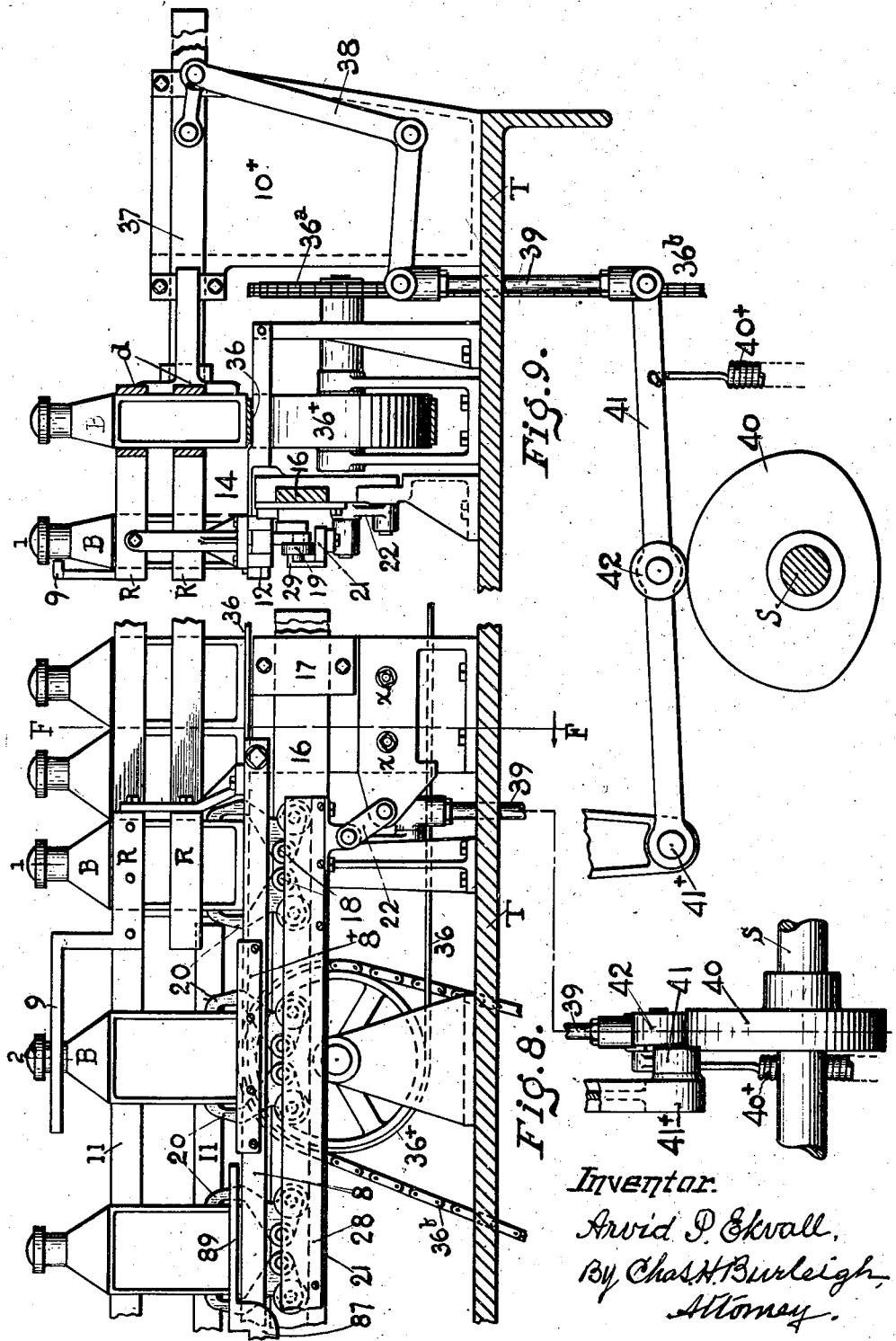

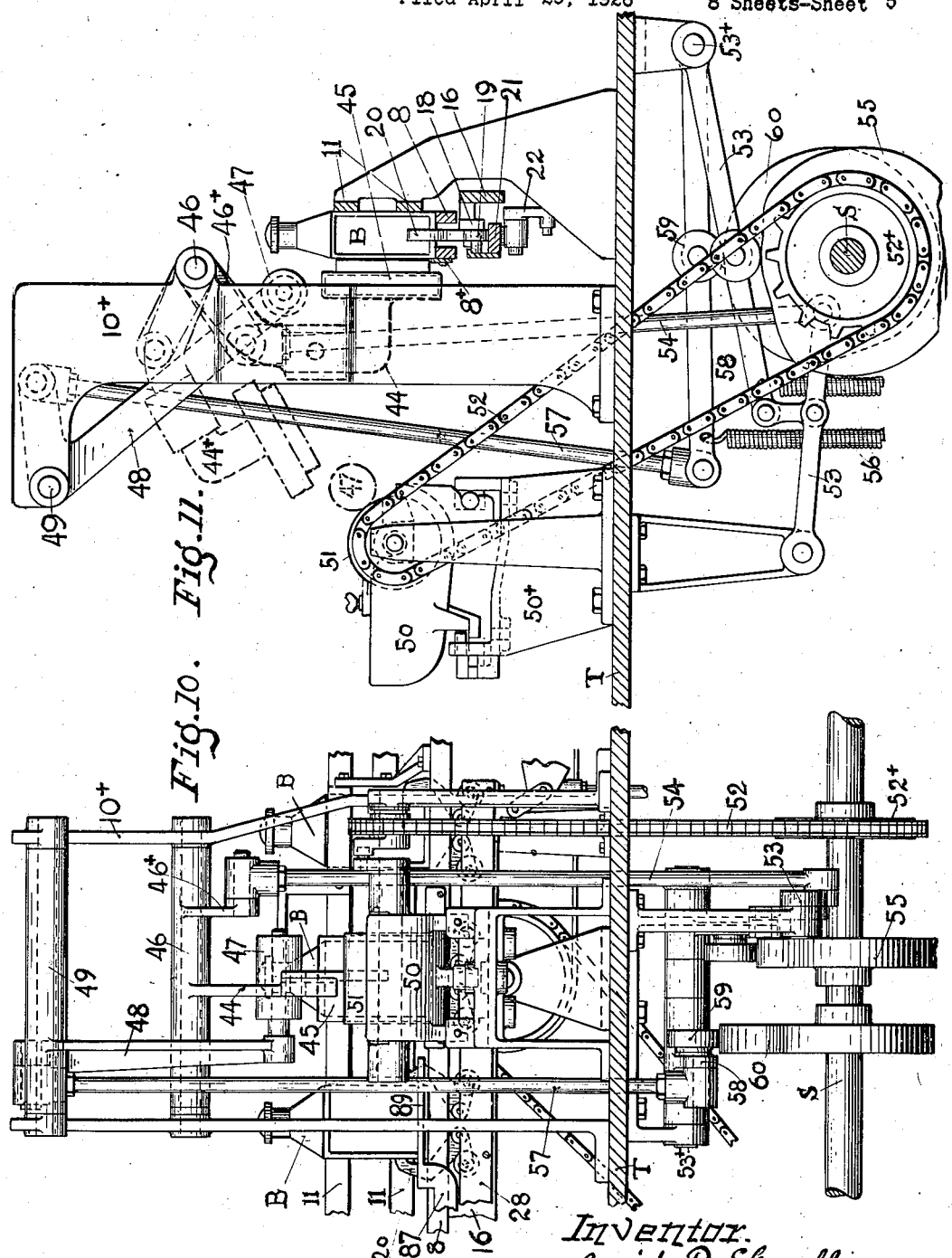

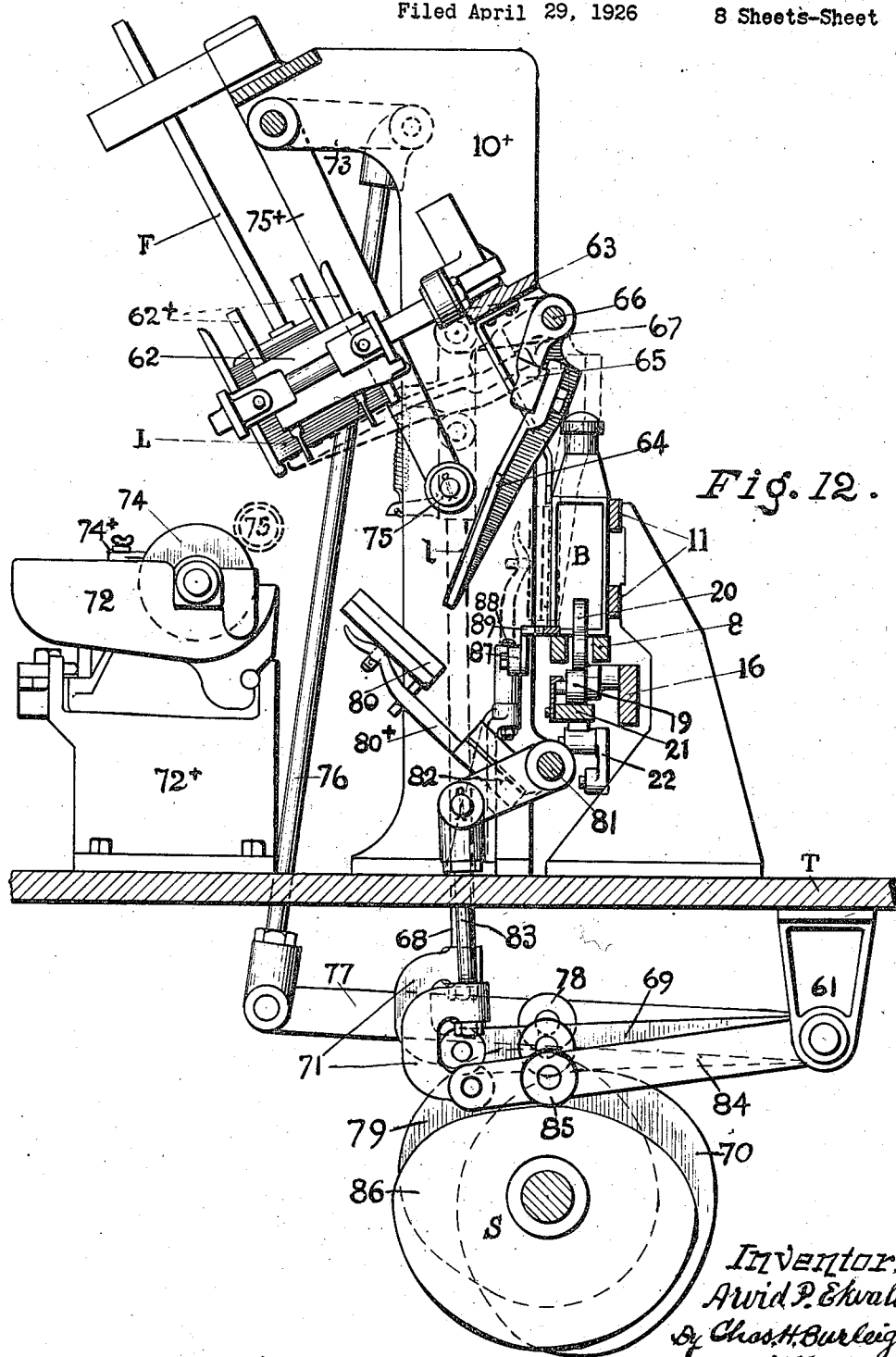

May 24, 1927.
A. P. EKVALL
1,630,235
LABELING MACHINE
Filed April 29, 1926      8 Sheets-Sheet 7
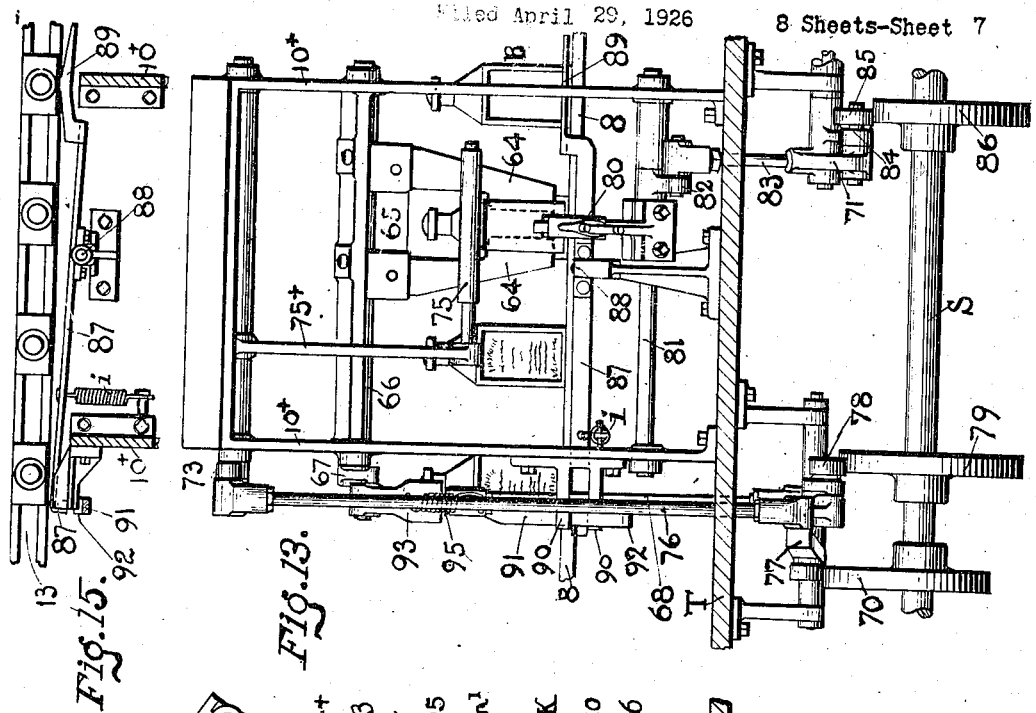
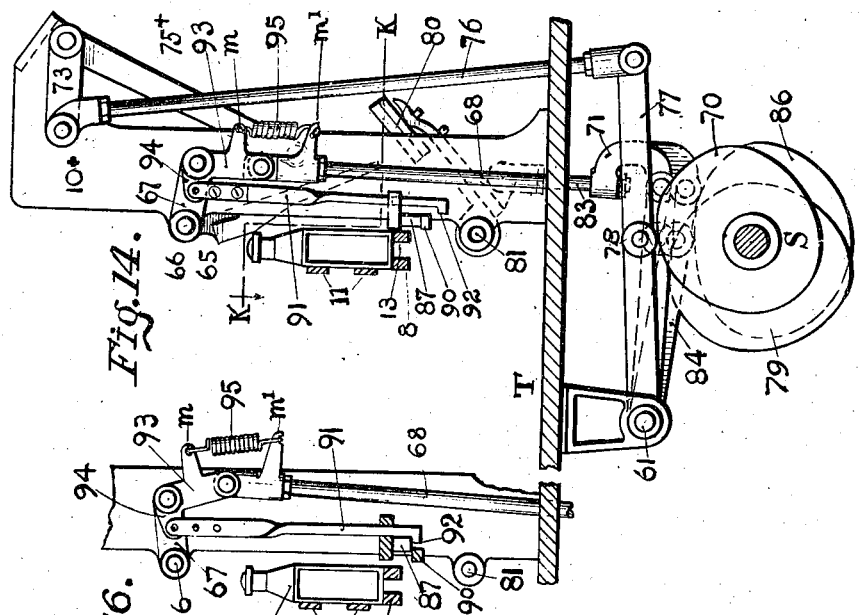
Inventor.
Arvid P. Ekvall
By Chas. H. Burleigh.
Attorney May 24, 1927.
A. P. EKVALL
1,630,235
LABELING MACHINE
Filed April 29, 1926    8 Sheets-Sheet 8
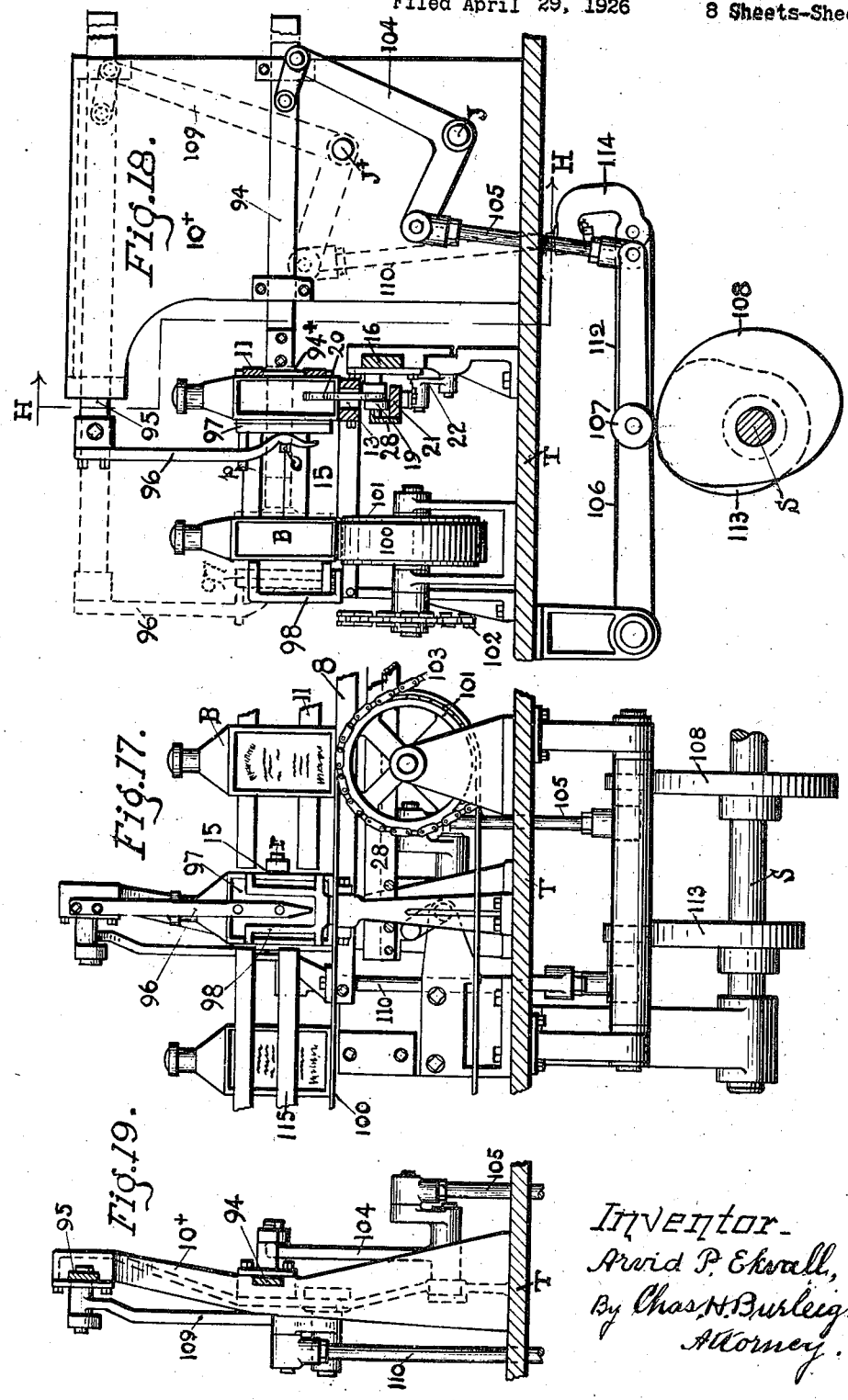

Patented May 24, 1927.

1,630,235

UNITED STATES PATENT OFFICE.

ARVID P. EKVALL, OF WORCESTER, MASSACHUSETTS, ASSIGNOR TO ECONOMIC MACHINERY COMPANY, OF WORCESTER, MASSACHUSETTS, A CORPORATION OF MASSACHUSETTS.

LABELING MACHINE.

Application filed April 29, 1926. Serial No. 105,467.

This invention relates to mechanism for automatically labeling articles such as bottles, cartons and other containers or packages; more especially those of square, oval or other non-circular cross-section shapes; and when in upright position; the prime object being to provide an organized mechanism that will operate with successful efficiency, economically, and with desirable speed of action.

My invention consists in certain novel features and combinations embraced in the various operating portions of the machine as defined; and in the arrangement and organization of the mechanism for performing their respective functions in the manner substantially as set forth and explained in the following description; the particular subject matter claimed being hereinafter definitely expressed in the summary.

One object of my invention is the provision of means, organized substantially as described, for propelling articles to be labeled along a directing way where they are presented at predetermined intervals or stop stations, to the action of an infeeding mechanism that places the individual articles in spaced alignment, and successively at other stations to an oscillating gummer device, then to the cooperation with swinging label-pickers of a label-gumming and applying means; and to devices for pressing or wiping-on the label, and to a transversely arranged ejector means that shifts the labeled article laterally from the direct way onto a discharge traveller, offset from but moving parallel with the direct way.

Another important feature of my invention consists in a labeling machine, including a laterally oscillating article-gummer device and a laterally acting label-gumming and applying mechanism, respectively located at different predetermined stations, with means for supporting and advancing the bottles or articles to be labeled, whereby such articles or bottles, in upright standing relations, and spaced in serial order, are caused to slide at predetermined intervals apart and by positive intermittent movements, along a stationary guideway whereon they are advanced from station to station by mechanism that simultaneously seizes the individual bottles or articles at opposite sides thereof and moves the same from one station to the next, then releases them and returns to its primal position for seizing the next bottle or article in the series and repeating the movement.

Another feature consists in the combination with means for advancing bottles or articles and intermittently stopping the same at predetermined stations; of means for applying gum or adhesive substance to the surface thereof including an oscillating gummer pad, a gum delivering means, and a swinging transfer roll cooperating therewith.

Minor features and combinations of my invention will be set forth and explained in the following detailed description.

In the drawings, (eight sheets)—

Fig. 1 represents a top plan view of a labeling machine, illustrating the features of my present invention.

Fig. 2 is a separate plan view of parts that serve for guiding and propelling the bottles or articles to be labeled while in the machine.

Fig. 3 is a front elevation view of the machine.

Fig. 4 is a separate plan view of the operating shaft.

Fig. 5 is a sectional elevation showing the propelling mechanism.

Fig. 6 is a transverse vertical section of the same at line I, I on Fig. 5.

Fig. 7 is a fragmentary plan view of the gripper-claws and coacting members.

Fig. 8 is a front elevation of the entrance end of the run-way, at the position of the primary transfer or infeed mechanism.

Fig. 9 is a side elevation of the infeed mechanism; some parts being in section, on line F F Fig. 8.

Fig. 10 is a front elevation of the gum-applying mechanism at that portion of the mechanism included by line C C on Fig. 1.

Fig. 11 is a transverse vertical section at line D D on Fig. 1 showing the side of the gumming means.

Fig. 12 is a transverse vertical section, on line E E on Fig. 1, showing the side elevation of the label-applying mechanism, and grip-finger devices in their relation to the dual-track runway.

Fig. 13 is a front elevation of the label-picker mechanism; some of the parts being omitted for clearness of view.

Fig. 14 is a left side elevation of the same in part.

Fig. 15 is a fragmentary plan view of the means for controlling the label-feed.

Fig. 16 is an upright fragmentary view illustrating the action of the picker relief or label feed stop.

Fig. 17 is a front elevation view at the position of the discharge passway.

Fig. 18 is a transverse vertical section at line G G on Fig. 1 showing the means for shunting the completed articles from the tracks to the discharge traveler.

Fig. 19 is a sectional elevation view taken at line H—H on Fig. 18.

Referring to the drawings, the numeral 10 indicates parts of the stationary frame the various parts of which are suitably formed for supporting the working mechanisms in their respective relations for performing their functions in the manner substantially as specified. The frame is in part formed as a bed-plate or table T firmly supported upon legs or standards of convenient height.

S indicates an operating shaft, or cam shaft, arranged longitudinally beneath the table and rotatable in bearings supported upon the table, frame or standards.

Motive power is applied to the shaft S for operating the machines; preferably from an electric motor M located upon the machine or adjacent thereto; or by any suitable arrangement of belt or gearing from some convenient source of power. A suitable clutch is best provided for putting the mechanism into and out of action, as desired.

S+ indicates a transversely disposed shaft operatively connected with shaft S by beveled gear G and carrying cams and sprockets for operating certain parts of the mechanism hereinafter described.

In the present application I have illustrated the mechanism as operating upon square shaped bottles having paneled faces to receive the labels; but the mechanism is intended and adapted for labeling flat, oval, or other analogous shaped bottles, containers, articles or packages; therefore the terms "bottle" or "article"; as used in this specification is to include all such containers and articles for the labeling of which this claimed mechanism is applicable.

At a convenient level above the table T there is arranged a runway 12 for supporting and guiding the bottles or articles B to be labeled, during their advancement through the gumming and label-applying operations; said runway comprises a pair of parallel track bars 8 with back guard rails 11, and propelling means of the character hereinafter described.

The dual-track bars are disposed approximately horizontal with their top surfaces in the same plane, the two track-bars being secured together and supported at their ends only, and arranged with a longitudinal intervening space 13 between the tracks extending throughout their available working limit. The width of the runway approximately coincides with the width of the articles or bottles to be labeled, which in practice, stand upright and slide upon the tracks, 8, bridging across the intervening space 13, and steadied above the track level by the guard rails 11 which keep the articles B in uniform alignment.

The available length of the track-way is apportioned to present a series of uniform predetermined intervals and stop positions or stations, the latter being indicated on Fig. 2, by the lines 1, 2, 3, 4, 5, 6 and 7, which coincide with the intermittent movements of the feed-mechanism and timing of the successive actions, in their operation.

The runway 12 is provided at its receiving end with a laterally arranged infeed passway 14 at the rear side of the tracks; and at its delivery end, with a laterally arranged exit passway 15 at the front side of the tracks. These passways have their bottoms on the same plane as the runway and are provided with suitable side guards for keeping the articles in proper alignment relation.

Parallel with and adjacent to the runway tracks, I provide an endwise reciprocating bar or member 16 supported, near the ends of the tracks, to slide in suitable guides or brackets 17 fixed upon the table T. Said bar 16 carries thereon a series of pairs of horizontally pivoted oppositely swinging clutch-fingers or gripper-claws 20 that are located in alignment with the space 13, and have upward curved ends that swing up and down within said space between the two track-bars 8. The pairs of gripper-claws rock upon transverse pivot studs 18, which are supported firmly in the carrier-bar 16, and are arranged quite near each other in each pair. Upon a lower projection on each of the gripper-claws there is a horizontally projecting stud 19+, upon which is mounted a free running roller 19 that serves both as an anti-friction traveler and as a counter weight for the claw.

The spacing from center to center of the pairs of gripper-claws corresponds with the spacing between the several stop stations, 1, 2, 3, etc.

Beneath the entire series of gripper-claw rolls 19 and parallel with the track level, is an upwardly and downwardly movable lifter-bar or member 21 upon which said rolls 19 rest and travel. Said bar is supported by rocking links 22 and limited up and down movement is imparted thereto, in the present instance, by an angle-lever 23, a rod 24 connected with a pivot arm 25, having a stud-roller that engages with and is actuated by a suitable cam 26 mounted upon the cross shaft S+ that connects by gears G with the operating shaft S. The connection 24 is best provided with means 27, for adjustment of its length for accurately regulating the level of the bar 21 so as to close the gripper-claws 20 against the opposite surfaces of the bottles or articles B with the desired degree of force.

When the lifter-bar 20 is elevated to the position shown in full lines Fig. 5, the claws or grippers 20 are swung up and clasp the opposite sides of the article B holding it firmly in upright or desired position for advancement along the tracks. Then when the bar 21 is lowered to the position indicated by dotted lines 21+ the claws or fingers 20 are caused to swing apart and down to a position below the level of the tracks, as indicated by dotted lines at 20+; thus releasing the bottle or article B, which is left standing upon the tracks at the exact position of the stop station, while the bar 16 and gripper-claws 20 move back to primary position for seizing a bottle or article at the next preceding station. In like manner each pair of gripper-claws in the series is simultaneously operated to seize its respective article B, move it forward one step, releasing it there, then returning to take the next article in its order, each pair of gripper-claws covering the space of one interval movement.

The weight of the rollers 19 may serve in some instances for opening or retracting the gripper-claws, but preferably a strip or plate 28, having a backward top offset or flange 29, is attached to the bar 21, said offset overlying or engaging with the forwardly projecting ends of the studs 19+ whereon the rollers 19 are mounted; so that when the bar 21 is depressed the series of rollers 19 will be uniformly moved downward and all of the gripper members 20 positively retracted.

The end faces of the gripper-claws are best fitted to properly seat against surfaces of the bottle or article B, so as to contact therewith without undue shock. Said faces may, if in any instance so desired, be provided with a soft or non-metallic covering.

The number of pairs of gripper-claws 20 upon the carrier member 16 corresponds with the number of stop positions less one for the intermittent advance of the articles along the tracks or race-way, while effecting the reception, labeling and discharge of the article operated upon.

For reciprocating the gripper-carrier or slide 16 there is provided an angle-lever or member 30 rockably fulcrumed upon a shaft 31 supported in the under frame; said angle-lever having an upper arm 32 joined by a pivotally connected link 33 with the carrier-bar 16, and its lower arm provided with a roller 34 that engages an actuating cam 35 that revolves with the shaft S+. (See Figs. 5 and 6.)

The bottles or other articles to be labeled are received at the infeed end of the runway, and are propelled intermittently along the tracks, to the discharge end thereof; moving by successive stages from station to station, by the reciprocation of the bar 16 and gripper-claws carried upon said bar.

Adjacent the outer end of the infeed passway 14 there is arranged a traveling belt or chain 36 passing around a pulley 36+ mounted upon an axle disposed in transverse relation to the runway tracks 8, to turn in bearings fixed upon the table T and operated by a sprocket wheel 36ª and chain 36ᵇ from a sprocket wheel 36ᶜ mounted upon the operating shaft S+. The top surface of the upper reach of said belt or chain is approximately level with the track surface of the runway. Guard rails d are located along the belt above its respective edges to keep the bottles or articles thereon in traveling alignment. The articles B to be treated are delivered by the belt at the end of the passway 14 and are then transferred to position on the runway tracks.

The means for transferring the bottle through the infeed passway to the tracks 8 is best shown in Fig. 9. The guard at the front of the infeed passway 14 is formed with a right angled horizontal offset R. The upper part of which may be horizontally extended as at 9 for preventing tipping forward of the bottle or article when gumming action occurs. (See Figs. 2 and 8.) A cross track section is provided, level between the belt 36 and tracks 8. At the rear and above the belt level there is a horizontally reciprocating pusher 37 provided with an angular head having at one side a forwardly projecting flange or lip e that forms a stop for the train of articles B when the pusher is at its rearward position; and its opposite side with a rearwardly projecting member f that serves as a gate for arresting the oncoming train of bottles, or articles, while pusher is performing its action. The pusher bar 37 slides in bearings on a suitable upright stationary bracket 10+, and is operated to move a distance equal to that required for shifting a bottle transversely from the line of the belt 36 to the line of the runway. In the present instance the pusher is actuated from a suitable cam 40, fixed upon the operating shaft S, through the agency of the angle-lever 38, connecting-rod 39, and arm 41, fulcrumed to the frame and carrying the cam-engaging roller 42.

The runway and feeding members including the tracks 8, carrier bar 16, gripper-claws 20, rollers 19, and gripper-actuating bar 21, may be detached as a unit, from the machine, by removing the bolts x x that secure the respective ends of the said group to their support brackets.

The mechanism for applying paste, gum, glue or other used adhesive substance to the surface of the bottles or articles B, positioned upon the described runway is, in the present illustration, located at station 2. This mechanism is best shown in Figs. 10 and 11 and comprises a gum-applying pad 45, of the required size and shape, mounted upon a swinging arm 44 carried by an overhead fulcrum or rocker-shaft 46 supported in the upright frame 10⁺ secured upon the table T. The rocking axis is disposed above and approximately in same upright plane as the front side of the runway, and the arm is suitably crooked to accommodate the combinations. The arm 44 and pad 45 are arranged to swing downward on a line transverse to the line of the runway, to bring the pad flatwise against the front of the article to be gummed, as indicated in full lines on Fig. 11, and to swing upward to the position 44⁺, indicated by dotted lines thereon, for receiving its charge of adhesive from contact with a backwardly and forwardly moving transfer-roll 47 carried by a depending arm 48 attached to a rocking member 49 supported in the upper part of the frame 10⁺, and operated so that the face of the gummer-pad and transfer-roll move into contact.

A gum-supply reservoir 50 is removably supported upon a stand 50⁺ located upon the forward part of the table T, and is provided with a delivery-roll 51 rotated by a chain 52 and sprockets from the shaft S, also with suitable film regulating means, 51⁺. The rolls 47 and 51 are axially parallel with the runway tracks. The transfer roll 47 passes from contact with the face of the gum-delivery roll 51 to and across the face of the gummer pad 45 as the latter swings downward, thus charging said pad with a film of gum at each reciprocal action.

The gum-applying pad is actuated by a rod 54, connecting a crank arm 46⁺ on the rocker 46 with a lever means 53, below the table, and having a roller 54⁺ that engages with a cam 55 fixed upon the operating shaft S. Likewise the transfer roll 47 is operated to swing forward and back across the face of the pad by a rod 57 connecting an arm of the rocker 40⁺ with a swinging lever 58, carrying a roller 59 that engages with the cam 60 also mounted on shaft S; said cams being shaped to give the required co-active movements to the gummer-pad and transfer roll.

Along the location where the gum-applying devices operate, I provide a guard-strip 8⁺ attached to and projecting slightly above the track-bar. There is also provided an upper front guard 9 extending across the neck of or upper part of the bottle or article. (See Figs. 8 and 11.) These guards prevent displacement of the article upon the tracks by suction of the gummer-pad when it is drawn away from the gummed surface.

In adjacent relation to the dual-tracked runway and series of pairs of gripping-claws or feeding devices, I provide a label-gumming and affixing means of the character illustrated, (see Figs. 12, 13, and 14). In the present instance it is located centrally coincident with the stop station number 4, but may be at other determined station if in any instance desired. An overhead bottom-delivery label supply holder 62 is mounted at the front of the runway upon a cross bar 63 fixed between stationary frame members 10 standing upon and rigidly secured to the table T; the label-holder being preferably forwardly downward inclined. Said label holder is best constructed for adjustment to various sizes of labels and is provided with well known stakes 62⁺ for retaining the pack of labels L. A suitable follower means F is provided for keeping the pack of labels in close form as it diminishes. Such follower may be of any approved construction. Upwardly swinging pickers comprising plates 64 of the desired form, are attached to a head 65 fixed upon an oscillatable shaft 66 journalled in the standing frames 10⁺, and having a projecting crank arm 67 thereon connected by a rod 83 with a swing lever 69, fulcrumed to a bracket 61 fixed to the table, said lever being provided with a revolving cam 79 fixed on the shaft S, whereby the pickers 64 are actuated to move from the label pack to the face of the bottle or article upon the runway, and vice versa, at each revolution of said shaft. See dotted lines on Fig. 12, indicating the positions of pickers at their limits of movement.

The reservoir 72 for the supply of paste, gum or adhesive for the pickers, is removably supported upon a stand 72⁺ near the front of the table. It is provided with a rotatable gum-delivering roll operating therein and driven by a sprocket chain 74 running from a sprocket wheel 73⁺ mounted upon the shaft S beneath the table T.

Suitable film gaging means 74⁺ may be provided for the delivery roll for regulating the distribution of gum in well-known manner. 75 indicates a transfer-roll mounted on a swinging arm 75⁺ pivotally fulcrumed at its upper end on the frame 10, and having a crank-arm 73 connected by rod 76, with a swing lever 77 provided with a stud roller 78, that engages a revolving cam 79 fixed on shaft S. The transfer roll 75 swings from the gum delivery roll 74 across the face of the pickers 64 as they swing up towards the label pack, for taking the bottom label therefrom by adhesive action.

80 indicates the grip-finger for pressing the label against the article and stripping it from the gummed faces of the pickers as the latter move outward. Said grip-finger is supported upon an arm 80⁺ mounted upon a shaft or axle 81, that is arranged below and parallel with the runway, so as to swing downwardly forward, to avoid the pickers, and to swing upward and backward to catch the label as it is presented to the article B, and thereby to stick it against the previously gummed surface of the article, retaining it there while the pickers back away; thereby stripping the labels from the face of the pickers; after which the grip-finger is retracted leaving the label adhering to the face of the article. The grip-carrier or shaft has a crank arm 82 that is connected by link 83, with a lever 84 provided with a stud-roller 85 that engages a suitable cam 86 fixed upon the shaft S. The connection rods and their levers are respectively united by adjusting members 71 to facilitate regulation of the relative movements of the operated parts.

Combined with the label supply means, swinging pickers 64, and the race-way along which the bottles or articles B travel, I provide improved means for preventing the delivery of a label when no bottle or article will be in position to receive the label. This improved means (see Figs. 13, 14, 15 and 16) consists of a swinging lever 87 arranged at one side of the tracks, and supported on a stationary fulcrum pivot 88 at a medial position in its length.

At one end said lever is furnished with an offset lip or portion 89 that is adapted to swing (normally or by spring force) into the path of the feedway and to be forced therefrom laterally by the passing of a bottle or article on its way to the labeling station (No. 4) thereby actuating said lever. The other arm of lever 87, is arranged to move between stationary supporting lugs 90, and to engage, or dis-engage, with a notch or projection 92 upon a catch-bar 91, the end of which is pivotally attached to the head of the connecting rod 68 that controls the movement of the pickers 64. The connecting rod 68, which operates the crank-arm 67 of the picker-carrying shaft 66, is provided with a hingedly jointed head 93 the upper section of which has an integral projecting member 94 to which the upper end of the catch-bar 91 is connected, (see Fig. 14) while at the opposite side of the said head there is arranged a strong contractile coil spring 95 strained between upper and lower projecting lugs m, m, formed on the respective sections of the head, and serving to normally force the hinge connected members into straight alignment. The catch-bar 91 is arranged through a suitable guide to prevent lateral displacement of said bar. All of the hinging pivots of the head are axially parallel with the shaft 66.

When the lever 87 engages the lug 92 of the catch-bar 91 the hinge of the head 93 of the connecting rod 68 is flexed, as indicated on Fig. 16, so as to shorten the movement of the oscillating shaft 66 and pickers 64, thereby preventing the pickers from contacting with the face of the label-pack; consequently the feeding of labels is interrupted whenever absence of an article to be labeled permits the end 89 to remain in the path of the runway, thereby allowing the opposite end 87+ to engage the lug 92 on the catch bar 91.

For transferring the bottles or articles B, after the label is attached thereto, from the tracks 8, through the laterally disposed exit pass-way 15 to a traveling discharge belt, 100, I provide a reciprocating pusher 94 mounted in guides upon a standing portion of the frame, at the rear of the runway and in alignment with said exit passway. The pusher head 94+ is formed to seat against the article, at its back, and to propel said article individually along the passway, without materially changing its upright relation or turning it circumferentially, so that the articles are presented upon the moving belt 100 in approximately the same order as they are advanced along the runway tracks 8. The passway is provided with a suitable bottom, and side guard rail r. An outstanding front guard or forked abutment member 98 is arranged at the forward end of the passway for arresting the forward movement of the bottle or labeled article at the desired predetermined position in relation to the discharge belt.

Parallel with the pusher 94, I provide an endwise reciprocating bar 95 having attached to its front end a depending arm 96 carrying a presser pad 97, approximately in line with but in oppositely facing relation to the pusher-head 94+, so that the freshly labeled article may be pressed between said pusher head and presser-pad (see Fig. 18) for firmly and smoothly fixing the label in position. The pad 97 is best loosely secured to its arm 96 by a stud c that permits slight tilting motion thereon, and provided with a slot and pin p that prevents lateral rotation of the pad in respect to its square position upon the carrying arm.

The guard 98 is supported at stationary position and is formed so that it will not interfere with the movement of the presser 97, but will stop the labeled article at a given position; permitting the presser-pad to move a limited distance away from the face of the label before the pusher starts on its backward movement, thus leaving the labeled article entirely free but positioned upon the belt 100, to be taken away by said belt in due order.

The pusher-bar 94 in the present instance is pivotally connected to one arm of an angle lever 104 fulcrumed at J and having its other arm connected by a rod 105 with a lever 106 provided with a stud roll 107 that engages with a suitably shaped cam 108 fixed on the operating shaft S.

The presser device 97 is independently controlled or actuated preferably by means of similar form, comprising an angle-lever 109 fulcrumed at J⁺, its upper arm linked to the bar 95 and its lower arm connected by rod 110 with a lever 112 having a stud roller that is engaged and actuated by a cam 113 mounted upon the shaft S.

The connecting members, as 110, are preferably provided with means 114 for adjustment of their length, for regulating the relation of the pusher 94 and presser 95 in respect to the position of the bottle or article B, when different forms or sizes are to be operated upon.

The discharge belt 100 is arranged upon a pulley 101 with its upper reach at proper level or receiving the labeled articles B from the passway 15 as they are propelled forward by the pusher 94. Said pulley 101 and belt 100 are operated by a sprocket-wheel 102 and chain 103 from a sprocket-wheel mounted upon the supplemental shaft 103⁺ which in turn is operated from a sprocket wheel 201 on the shaft S⁺ beneath the table.

The traveling infeed belt 36, the dual-track runway 12, and the traveling discharge belt 100, are severally arranged in parallel relation or in the same general direction, but on different lines; the line of the infeed belt being located some distance back from the line of the runway tracks, while the line of the traveling discharge belt 100 is located at some distance forward from the line of the runway tracks, as illustrated in Figs. 1 and 2. One belt 36 cooperating with the infeed mechanism and the other belt 100 with the delivery mechanism.

These traveling belts 36 and 100 may be, respectively, of any convenient or desired length, their outward extended portion being supported in well-known manner. Suitable guard rails 115 are arranged along the sides of the discharge belts. The peculiar arrangement of the feedway and traveling belts, in offset parallel order, with transverse passways as set forth is a feature of improvement that facilitates construction; utilization of space in floor area, and increases the speed efficiency in service.

The operation is as follows: The bottles or other articles B to be labeled are placed upon the belt 36, in any convenient manner. The machine being in operation, the row of articles are moved forward until the foremost is arrested against the flanged pusher head. The pusher then moves forward transferring the article through the passway 14 to an exact exit position upon the tracks at station 1. The pairs of gripper-claws 20, by the lifting of the bar 21, are caused to swing up through the space 13 and clutch the article uniformly and firmly between their ends, thereby accurately centering it in relation to the stop station position. The endwise movement of the gripper-carrier 16 causes the pairs of gripper-claws 20 holding the article B to move a distance equal to the space between the stop stations; thus sliding it along the runway and stopping it exactly at the succeeding station. Lowering of the bar 21 then permits the gripper claws to fall away fully releasing the article and leaving it standing in place while the slide bar 16 and pairs of gripper claws return to primal position ready for repeating their action. In this manner the articles are fed along the runway intermittently one step at a time, each pair of gripper-claws serving to effect a movement from one stop station to the next; these movements being timed with a sufficient dwell at the stations to allow other parts of the mechanism to perform their respective functions.

While an article is at station 2 the gummer-pad 48 having taken its charge of adhesive, is swung down and deposits a film thereof on the surface of the article and then retreats.

At station 3 nothing is effected except in the absence of the bottle or article B at that point the lip 89 of lever 87 is permitted to remain in the path of the runway and by reason of its other end engaging the catch-bar 91 prevents the delivery of a label, as hereinbefore described.

At station 4 the pickers 64, having received a charge of adhesive, take a label from the pack and swing down presenting it to the face of the article, while the grip-finger 80 swings up and clamps it centrally between the pickers, upon the article, retaining it in place while the pickers swing therefrom. The grip finger is then retracted leaving the label adhering to the article.

At stations 5 and 6 there is, in the present instance, no special performance, these being idle stations, affording time for the labels to become damp or the gum thereon to become somewhat more tacky.

At station 7 the bottle or article B and its label are embraced and squeezed between the pusher head 94 and presser-pad 97, laying the label smooth and causing it to adhere firmly to the surface, while the pusher and presser together move forward carrying the labeled article through the exit-passway onto the belt 100, at the proper position the movement of the pushed article is arrested by the abutment 98, while the presser-pad 97 continues its forward movement for a slight distance (see dotted lines Fig. 18) as the pusher retreats thus leaving the labeled article free, to be carried away by the traveling action discharge belt, while the pusher and presser members move back to primal position.

The upwardly swinging grip-finger 80 acts to strip the label 1 from the pickers 64 and causes it to adhere to the previously gummed surface of the bottle or article B, then instead of holding it pressed against said surface until the label is wiped down, (as is the practice in other labeling machines employing a grip finger) the grip-finger is immediately retracted permitting the label to be carried forward by its adhesion to the gummed surface, and is thus advanced without interference from station to station in its approach to the final station of the runway. This action greatly facilitates the practical operation of the mechanism, and is an improvement of some importance.

What I claim is—

1. A labeling machine comprising in combination, means for supporting and directing articles to be labeled consisting of a dual-track way having an intermedial longitudinal space, means in lateral relation to said track way for gumming and applying a label to the article at a predetermined station thereon, said means including a standing frame, a bottom-delivery label-supply holder mounted thereon, oscillating label pickers fulcrumed above the track way, an oscillating stripper-finger fulcrumed below the track way, the fulcrum axes being approximately in the same vertical plane as the front of the trackway, a gum-supply reservoir and means for transferring gum to the picker faces, means for severally actuating the gumming, and applying devices, article-propelling means comprising a plurality of pairs of gripping members adapted for positively closing against the sides of the article above the plane of the tracks for effecting its forward movement, and opening and retracting below the track level for its backward movement, means for reciprocating said gripper members, means for closing and opening the pairs of gripper members at the limits of the reciprocative movement, and a laterally moving pressing wiper for finally smoothing on the label, and removing the labeled article from the track way; said mechanism constructed and organized for operation substantially as set forth.

2. In a labeling machine, in combination with means for gumming and for applying labels, and a dual-track runway for supporting articles to be labeled, an article-propelling means consisting of a pair of oppositely disposed adjacently pivoted swinging gripper-claws having upwardly curved prongs with contact surfaces at their ends disposed in the same plane with the runway, the body portion of each claw provided with an eccentrically located projecting stud having a free running roller mounted thereon, a reciprocating parallel carrier-bar on which said claws are individually pivoted, a lifter bar underlying and supporting said rollers, means for reciprocating said carrier and means for imparting upward and downward movement to said lifter bar.

3. In a labeling machine, the combination of a longitudinally interspaced dual track runway adapted for supporting and guiding articles to be labeled advanced thereon by intermittent successive movements between a series of stop-stations at uniformly spaced intervals along the runway, means for receiving and positioning the articles individually upon said runway at a primary station, means for applying adhesive gum to the articles, at another station, comprising a laterally swinging gummer-pad having an oscillating carrier, actuating means therefor and means for supplying gum to the face of said pad, label applying means at a succeeding station, including a label supply, laterally acting pickers adapted for gumming and delivering a label adjacent the article on the runway, means for transferring the label from the pickers to partly stick it to the gummed surface of the article, and instantly retreating therefrom, means at a later station for smoothing down the partially adhering label, and means at a final station, for discharging the labeled article, means for presenting the articles for action thereon at the several stations, comprising a reciprocating carrier, uniformly spaced pairs of article engaging members mounted on said carrier and projectable through the runway space, means for simultaneously controlling said pairs of engaging members to grip the articles above the track when it moves forward, and to release and descend below the track level when it moves backward, and means for reciprocating said carrier a distance equal to one interval space.

4. In a labeling machine, the combination with an article supporting way comprising a pair of longitudinally parallel interspaced tracks, guards along the rear edge thereof, means for advancing the articles along said way by successive intermittent movements and stops at regular predetermined intervals; of a primary gum-applying means consisting of an oscillating member supported above and approximately in the plane of the front edge of the tracks, and provided with a forward downwardly projecting arm carrying a gumming-pad adapted to swing down into surface contact with the upright face of the article standing upon said tracks, a gum supply reservoir having a revolving delivery roll therein parallel with the trackway, a gum-transferring roll mounted upon a swinging arm and adapted to swing from said gum supply means to and across the face of said gum-applying means while in its retracted relation, means for operating said swinging parts, respectively actuated by suitably formed cams mounted on an operating shaft.

5. In a labeling machine, the combination of a runway for the articles to be labeled, label applying means adjacent said runway, means for intermittently advancing the articles from station to station thereon, including pairs oppositely arranged swinging gripper-claws, a carrier bar on which said gripper-claws are rockably mounted, means for reciprocally moving said carrier bar and gripper-claws, means for controlling the closing and opening action of the gripper-claws, means for applying adhesive to the article stationed upon said runway; said means comprising a swinging arm, its pivotal fulcrum positioned above the runway, a gummer-pad fixed to the backwardly offset lower end of said arm to swing laterally to and from the front of the runway, a gum supply reservoir provided with a rotating delivery-roll, a swinging arm depending from a rocker member at the top of the frame, a free rolling transfer-roll carried upon an axle at the lower end of said arm, to move from said gum-delivery roll to and across the face of said gummer-pad, the gummer-pad mechanism, and the transfer roll mechanism being independently actuated by separate cams mounted upon the operating shaft.

6. In a labeling machine of the character described, the combination with the article feed guideway comprising supporting tracks, and guard rails, article-gripping feeder clutches, gripper-controlling means label applying mechanism, and a gumming mechanism including a gum-applying pad that moves laterally into and from contact with the article stationed upon said tracks; of a guard-plate attached to and projecting above the level of the front track, and an upper guard member comprising a stationary longitudinally disposed arm extending parallel to the feedway along the front of the gumming station, for the purpose set forth.

7. In a labeling machine, in combination, a dual-track runway, a plurality of pairs of gripper-claws, a reciprocating carrier whereon said gripper-claws are pivotedly supported, means for reciprocating said carrier, and means controlling the swinging action of said grippers, a label-applying means comprising a gum-supply reservoir located forward of said runway, its gum-delivery roll axially parallel therewith, an overhead bottom-delivery label supply holder positioned above the reservoir, means for retaining a pack of labels on said holder and releasing labels singly therefrom, backwardly and forwardly swinging label pickers carried on an oscillating member fulcrumed above the runway to swing from the face of the label pack to the face of the article standing upon the runway, a gum-transfer roll carried by a depending arm and adapted to swing from the gum-delivery roll to and across the face of the moving pickers, operating connections for the picker carrier member, and for the transfer roll carrier, respectively, actuated and controlled by cams fixed on the operating shaft.

8. In a labeling machine, the combination with a supporting table, a dual-track feedway for articles, above the table, a rotatably operating cam-shaft beneath the table, automatically controlled means for intermittently moving the articles along said feedway, releasing and stopping the same at interval stations thereon; of label gumming and applying means comprising an upright frame standing upon the table adjacent the side of said feedway, a bottom delivery label-holder containing the supply pack of labels supported on said frame, an oscillatable picker-carrier and an oscillatable grip carrier journalled upon said frame respectively above and below the feedway with their axes approximately in the same plane with the front line of the tracks, label-picker plates attached to said picker-carrier, to swing from the label pack to an article standing upon the feed-way, a grip-finger attached to said grip-carrier to swing upward against the label as it is presented to the article, a gum supply reservoir supported upon the forward part of the table, a gum-delivering roll rotating in said reservoir, a transfer roll carried by a depending arm to swing from the gum delivery roll across the faces of the pickers, said arm attached to a rocker member journaled in the upper part of said upright frame, means for independently actuating the picker-carrier, grip-carrier, and transfer-roll-carrier, including severally, a connecting-rod, a lever fulcrumed beneath the table and provided with a cam-engaging stud roll, and separate cams mounted upon the operating shaft.

9. In a labeling machine a longitudinal dual-track runway for the articles to be labeled, means for feeding articles along the path of said runway, stopping at intervals, comprising a plurality of pairs of oppositely swinging clutching members, a carrier whereon said members are pivotedly supported, said carrier having reciprocal movement approximately parallel with the runway path for a distance of one interval, a lifter bar and bar-actuating means for controlling the gripping and release action of the clutching members, a forwardly overhanging label pack holder, an oscillatable picker carrier supported on the standing frame above the runway, depending picker-plates removably attached to said carrier to swing laterally from the label pack to the runway, a transfer-roll carried by a depending swinging arm and moving from and to the pickers, a gum-supply reservoir at the front, an upward swinging grip-finger having its arm attached to a rocking carrier journalled below the runway, and means for independently operating said swinging member.

10. In a labeling machine, a runway comprising longitudinal interveningly spaced parallel tracks whereon articles to be labeled are slidably supported in upright relation, said runway apportioned for a series of stop stations, guides parallel with and above the rear of said tracks, a reciprocating carrier bar longitudinally parallel with the runway, a plurality of pairs of opposite swinging clutch members pivoted on said carrier below the tracks, and provided with gripper-claws adapted to swing vertically through said intervening space for clutching and releasing the article above the track level, means for reciprocating said carrier bar a distance equal to the interval between the stop-stations, means for controlling the closing and opening of the gripper claws, a gum-supply means including a downwardly swinging-gum applying member, a label applying means adjacent the front of the runway including downwardly swinging label pickers and an upwardly swinging grip device in lateral relation to the runway, means for delivering gum to said pickers, and means for actuating said mechanisms.

11. In a labeling machine, the combination of a feedway having longitudinal tracks for supporting and guiding the articles to be labeled, reciprocatively operating gripping devices that move said articles from station to station along the feedway, label-applying mechanism including a gum-supply means, an upright frame, a label holder supported thereon for containing the supply pack of labels, an oscillatable picker-carrier journaled on said frame above the feedway, depending picker-plates attached to said carrier to swing from the label-holder to the side of the feedway, an operating shaft, a cam fixed thereon, and picker-actuating connections pivotally attached to an arm on said carrier, said connection provided with a hinge jointed coupling, having an outstanding lug on its upper part, and provided with an outwardly projecting arm above and below the hinging joint, a contractive coil spring uniting said arms, a depending catch-bar connected to said outstanding lug, and means for intercepting the upward movement of said catch-bar for flexing the coupling, controlled by the presence or absence of the article at a predetermined station on the feedway.

12. In a labeling machine, in combination, a runway comprising horizontal tracks for slidably supporting the articles to be labeled, means for intermittently advancing and stopping the articles at regular intervals along the runway, means for gumming and individually applying a label to the article standing on said runway at a predetermined station, comprising a label-pack holder, label gumming and applying pickers that take labels singly from the pack and swing down laterally in relation to the runway, picker actuating means including a connection rod having a spring-sustained hinge-jointed coupling, a catch-bar pivoted eccentrically thereon, a horizontally swinging centrally fulcrumed trip-lever adjacent the runway, one arm of said lever provided with a member adapted to enter the path of the runway, the other arm thereof adapted to engage said catch-bar and cause flexure of the coupling joint and limitation of the picker movement towards the label pack, when no article to receive the label is present.

13. In a labeling machine, in combination, means for applying adhesive upon the articles to be labeled, means for applying labels thereto, a longitudinal trackway for sliding articles thereon, said trackway apportioned for a predetermined number of intermittent movements and stop stations, reciprocatively carried pairs of swinging gripper claws for feeding articles from station to station along said trackway, a traveling belt in offset relation to said trackway for delivering articles to be labeled, a lateral passway leading from said traveling belt to the trackway, a laterally disposed reciprocating pusher-means in line with said passway for transferring articles individually from said belt to the trackway, and positioning the same at the first station thereon, directing guides for the pusher supporting bar, and means for actuating said pusher including a rotating cam fixed on an operating shaft, an angle lever fulcrumed on the frame and coupled to the pusher bar, and intermediate connections that transmit movement from the cam to said pusher means.

14. In a labeling machine, a longitudinal article-feed runway its length apportioned for a series of stop stations, means for intermittently propelling and stopping the articles along said runway, means in lateral relation to said runway for applying adhesive to the side of the article standing thereon, means for gumming and taking a label and applying the same to the article, positioned on said runway, means for ejecting the labeled article from said runway consisting of a reciprocating bar movable in-guides in lateral relation to path of the runway and having its head adapted to impinge against the article for pushing it through the exit passway; a second reciprocating bar slidable in-guides parallel with said first named bar, and having at its head a yieldable arm carrying a presser-pad adapted to seat against the face of the label in opposite relation to said pusher head, means for individually actuating said pusher and said presser devices for imparting motion thereto in the same general direction but permitting variation of pressure.

15. In a labeling machine, a runway including longitudinal tracks for slidably supporting articles to be labeled, gripping means for intermittently advancing the articles thereon, stopping and releasing the same at predetermined stations, a laterally swinging gum-carrying member for applying adhesive to the surface of the article at one stop station, a label supply means including downward laterally swinging label-pickers for gumming and applying a label to the article at another stop-station, means at a final station for ejecting the article from the runway, including a laterally disposed pusher impinging against the rear side of the article and moving across the runway, means for actuating said pusher, a traveling carrier for receiving the ejected article, means for pressing or smoothing on the label simultaneously with the ejecting action, and means for relieving the pressure from the label as the article is positioned on the traveling carrier.

16. In a labeling machine in combination with gum-applying mechanism, and label-affixing mechanism, a longitudinal runway for articles to be labeled, a traveling discharge belt in offset parallel relation to said runway, a transverse passway between said runway and belt, means for transferring the labeled article from the runway to said belt, a presser member moving therewith for pressing the label firmly against the surface of the article, and a stationary abutment member that limits the movement of the article when positioned upon the traveling belt, but permits the presser member to move from contact with the label.

17. In a labeling machine the combination with a runway adapted for supporting and guiding articles to be labeled, means for intermittently advancing said articles in spaced series along said runway and positively stopping and holding them at predetermined stations thereon, means for gumming and applying labels individually to said articles, at appropriate intermediate stations, means at a final station for shifting the article laterally from said runway and means for applying pressure upon the label opposite to but moving with the shifting action for the purpose set forth.

18. In a labeling machine, the combination with a runway for supporting and guiding articles to be labeled, means for propelling the articles along said runway in a series of intermittent advance movements and stops at regular predetermined stations, means for primarily gumming a surface on the article, label gumming and delivery mechanism including downwardly swinging label pickers that present a label laterally adjacent the side of the runway, and means for actuating said mechanisms; of an upwardly swinging grip-finger that strips the label from said pickers and causes its adherence to the primarily gummed surface of the article, means for effecting immediate retraction of said grip-finger, thereby permitting the intermittent feed movement to advance the article and adhering label to a succeeding station, and means for subsequently smoothing the label to the surface of the article.

ARVID P. EKVALL.